(12) United States Patent
White et al.

(10) Patent No.: US 6,988,165 B2
(45) Date of Patent: Jan. 17, 2006

(54) SYSTEM AND METHOD FOR INTELLIGENT WRITE MANAGEMENT OF DISK PAGES IN CACHE CHECKPOINT OPERATIONS

(75) Inventors: Ken White, Cedar Park, TX (US); Rob Reinauer, Austin, TX (US); Chunsheng Sun, Round Rock, TX (US); Richard Arnold, Austin, TX (US); Sunil Jacob, Austin, TX (US); Desmond Tan, Cedar Park, TX (US); Kevin Lewis, Austin, TX (US)

(73) Assignee: Pervasive Software, Inc., Austin, TX (US)

( * ) Notice: Subject to any disclaimer, the term of this patent is extended or adjusted under 35 U.S.C. 154(b) by 249 days.

(21) Appl. No.: 10/441,144

(22) Filed: May 19, 2003

(65) Prior Publication Data

US 2003/0217080 A1 Nov. 20, 2003

Related U.S. Application Data

(60) Provisional application No. 60/381,880, filed on May 20, 2002.

(51) Int. Cl.
*G06F 13/14* (2006.01)
*G06F 12/16* (2006.01)

(52) U.S. Cl. ............................ 711/113; 711/112; 711/4; 711/202; 707/203; 707/201; 707/205; 707/2; 714/5; 714/6; 714/7; 714/8

(58) Field of Classification Search ................ 711/4, 711/112, 114, 118, 130, 147, 150, 170, 161, 711/162, 202, 209; 714/1, 2, 5, 6, 7, 8, 13; 718/5; 707/200, 201, 202, 203, 204, 205
See application file for complete search history.

(56) References Cited

U.S. PATENT DOCUMENTS

| 5,600,596 | A | | 2/1997 | Shirakihara ............ 365/189.01 |
|---|---|---|---|---|
| 5,652,873 | A | | 7/1997 | Fecteau et al. |
| 5,664,160 | A | | 9/1997 | Fecteau et al. |
| 5,832,515 | A | | 11/1998 | Ledain et al. ................ 707/202 |
| 5,864,849 | A | | 1/1999 | Bohannon et al. ............. 707/8 |
| 6,021,408 | A | | 2/2000 | Ledain et al. .................. 707/8 |
| 6,055,547 | A | | 4/2000 | Cooper et al. .............. 707/204 |
| 6,081,875 | A | * | 6/2000 | Clifton et al. ............... 711/162 |
| 6,185,575 | B1 | | 2/2001 | Orcutt ........................ 707/200 |
| 6,208,991 | B1 | | 3/2001 | French et al. .................. 707/10 |
| 6,263,338 | B1 | | 7/2001 | Ronstrom et al. ............. 707/8 |
| 6,567,827 | B2 | * | 5/2003 | Bamford et al. ............ 707/203 |
| 2002/0095403 | A1 | * | 7/2002 | Chandrasekaran et al. ..... 707/1 |

* cited by examiner

*Primary Examiner*—B. James Peikari
(74) *Attorney, Agent, or Firm*—Brian W. Peterman; O'Keefe, Egan & Peterman, LLP

(57) ABSTRACT

A system and method are disclosed for improving the efficiency of write operations by intelligently managing disk pages that are written during checkpoint operations so that write operations can occur with reduced numbers of writes. As write data is received and cached, for example, by a database application, disk pages are allocated to the write data. When a checkpoint operation is taken to write the data cache to disk as modifications or additions to the database file, an intelligent write management module re-assesses the disk page allocation and re-maps disk writes to improve the efficiency of disk input/output (I/O) operations. As such, significant improvements in the speed and efficiency of database operations during checkpoint events are achieved.

24 Claims, 7 Drawing Sheets

SYSTEM AND METHOD FOR INTELLIGENT WRITE MANAGEMENT OF DISK PAGES IN CACHE CHECKPOINT OPERATIONS

RELATED APPLICATION

This application claims priority to the following provisional application: Provisional Application Ser. No. 60/381,880 entitled "SYSTEM AND METHOD FOR CREATING SEQUENTIAL WRITE PATTERNS AND ACCESSES THROUGH DISK ADDRESS REMAPPING," which was filed on May 20, 2002, the entire text and all contents of which are hereby expressly incorporated by reference in its entirety.

TECHNICAL FIELD OF THE INVENTION

The present invention relates generally to systems and methods of writing information from databases to disk, and more particularly, a system and method for accelerating database access through disk address re-mapping.

BACKGROUND

In a write-intensive environment, such as system checkpoint write operations for database server applications, input/output (I/O) requests cannot be eliminated. Prior art solutions have sought to batch writes together into system transactions or checkpoint operations, where each transaction flushes a number of user transactions to disk at the same time. During each system transaction, the server is unable to respond rapidly to requests, particularly additional I/O requests. Thus, it is desirable to reduce the frequency and duration of these system transactions. System transaction frequency is affected in part by the rate of change in the files and the local cache size. As system transactions become less frequent, writes have less of an immediate impact on performance. However, if one merely increases the cache size to reduce transaction frequency, the system transaction will contain more writes, rendering the server less responsive for longer periods of time during system transactions.

Many file management schemes use an indirection mechanism for finding a specific page on disk. All links within the data (such as the link between a key entry and the data record it indexes) use logical page numbers. The logical page numbers are translated into actual file offsets (known as the physical page) by a mapping mechanism. This mapping mechanism uses a directory or directory algorithms to locate a physical page given a logical page number. This approach allows the physical location of a record to change without requiring changes to its links—only the map has to be updated.

One of the characteristics of disk input/output (I/O) operations is that once the write begins, it costs much less to continue writing than it does for the disk to stop, reposition to a new place, and begin writing again. In other words, contiguous writes are significantly faster than non-contiguous writes. Furthermore, write calls require an operating system (OS) level event. Thus, a single large write performs substantially better than multiple small writes.

SUMMARY OF THE INVENTION

The present invention is a system and method for improving the efficiency of write operations by intelligently managing disk pages that are written during checkpoint operations so that a reduced number of writes is required to write a given set of data. As write data is received and cached, for example, by a database application server, disk pages are logically mapped to the write data. According the present invention, when a checkpoint operation is taken to write the data cache to disk as modifications or additions to the database file, an intelligent write management module re-assesses the disk page allocation and re-maps disk pages to improve the efficiency of disk input/output (I/O) operations. As such, significant improvements in the speed and efficiency of database operations during checkpoint events can be achieved.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
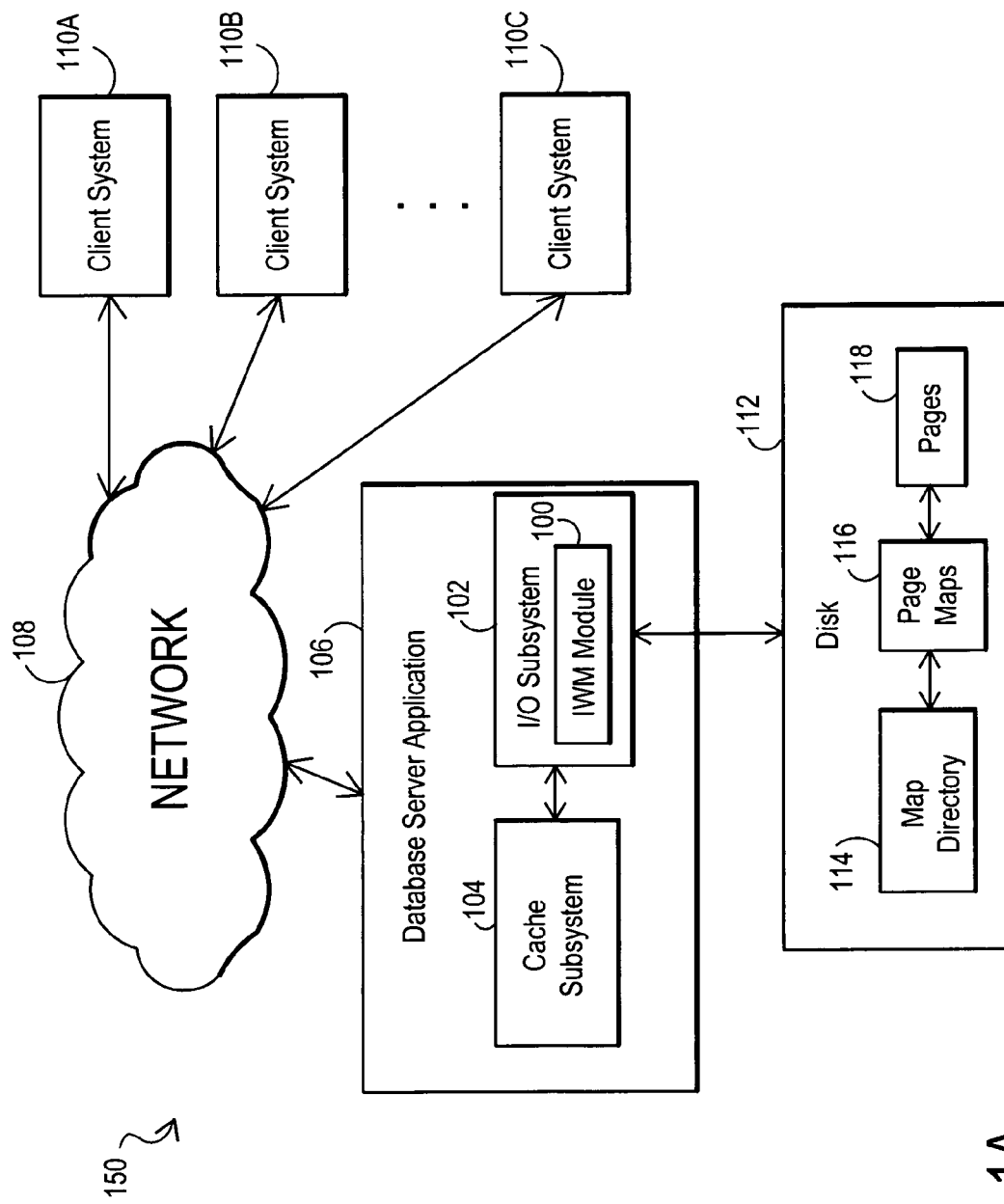
FIG. 1A is a block diagram for a database server environment utilizing an intelligent write management (IWM) module according to the present invention.

The present invention provides a system and method for improving the efficiency of write operations by intelligently managing disk pages that are written during checkpoint operations. Where prior art systems tended to allocate disk pages as write data was received based upon optimizing the operational efficiency of the central processing unit (CPU), the intelligent write management feature of the present invention provides a significant improvement by re-assessing and re-mapping disk pages when a checkpoint operation occurs so that disk input/output (I/O) operations can be made more efficient, thereby providing significantly improved operational efficiencies.

The intelligent write management (IWM) feature of the present invention provides particular advantages for database server applications that manage database files stored on disk and that manage local database caches. In part, the present invention provides significant performance enhancements to database write patterns by dynamically re-mapping database block locations such that randomly scattered write operations can be reordered and written sequentially, improving throughput and reducing the number of required OS level events. Additionally, these now sequential writes create data locality of reference by committing data accesses executed within a system transaction or checkpoint interval to a contiguous area of disk.

Most modern database management systems use portions of main memory to hold or cache recently read data from disk storage and to cache or delay writes to disk storage because of the access time difference between main memory accesses and disk storage access. However, in the typical database environment, the persisted database will be significantly larger than the memory of a computer system running the database server application. There will be some non-insignificant amount of random data access patterns to the cache in main memory. And some percentage of write operations will be requested by database client systems. Given these circumstances, the database cache will eventually be filled at least in part with pages that need to be written to disk storage, and these writes will typically be associated with many non-contiguous disk locations. The pages to be written to disk are typically written in an operation commonly referred to in the database industry as a "check-point" or "system transaction" operation. Because the disk locations or pages to be written are generally non-contiguous, individual write operations for each location are typically required. These numerous different and distinct write operations typically result in large disk latencies as the disk control systems re-position the disk and write heads for each different write operation. The intelligent location re-mapping and write management mechanisms of the present invention allow these many non-contiguous disk locations to be dynamically re-mapped to contiguous and/or sequential disk locations for write operations. These re-mapped locations then allow for the necessary write operations to be made more efficient and/or optimized by combining multiple small write operations into fewer large write operations, by causing the write operations to be in sequential locations, and/or to preserve the locality of reference information that existed during the time period, which filled the data cache in the newly written data.

Looking now to the drawings, FIG. 1A is a block diagram for a database server environment 150 utilizing an intelligent write management (IWM) module 100 according to the present invention. In the embodiment depicted, the database server application 106 communicates with a number of client systems 110A, 110B . . . 110C through a network 108. The network 108 can be any of a wide variety of wired or wireless network structures that provide for a communication path between server systems and client systems. As part of its operation, the database server application 106 includes a cache subsystem 104 and an I/O subsystem 102. The cache subsystem 104 operates to store recently used data, including write data received from the client systems 110A, 110B . . . 110C. This cached data is ultimately written to disk 112 during a system checkpoint operation, which occurs when the cache subsystem 104 determines that it is time for the cached data to be written to disk. As discussed further below, the I/O subsystem 102 utilizes the intelligent write management (IWM) module 100 to re-assess and re-map disk pages 118 for the write operations so that disk I/O operations are made more efficient and/or optimized. In these operations, the IWM module 100 uses page maps 116 that typically reside on the disk 112. The IWM module 100 also uses a page map directory 114, which can be stored on disk 112 or can be logically implemented through algorithms operated by the I/O subsystem 102 itself.

Figure 1B:
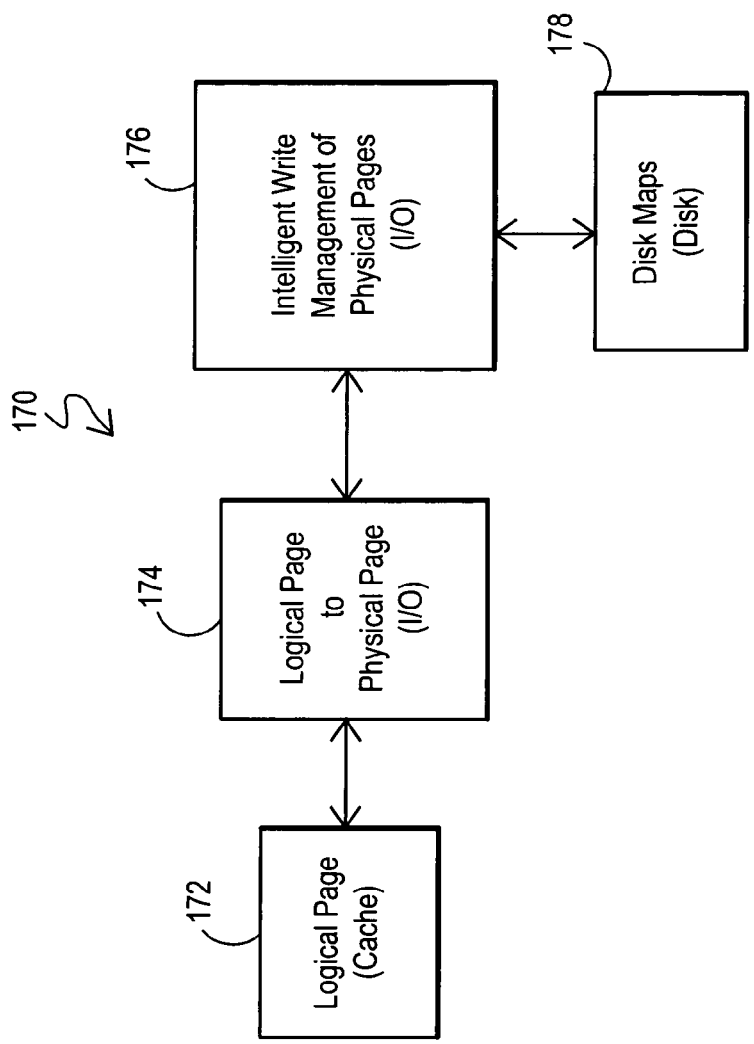
FIG. 1B is a block diagram for how disk pages are managed according to the present invention.

FIG. 1B is a block diagram for how disk pages are managed according to the present invention. As write data is received by the cache subsystem 104 within the database server application 106, this write data is allocated a logical page representing an allocation of disk space. This allocation of logical pages by the cache subsystem 104 is represented by block 172. In block 174, the logical pages are mapped to physical pages using knowledge owned by the I/O subsystem, and these physical pages represent actual physical locations on disk 112. According to the present invention, during a system checkpoint operation, the I/O subsystem 102 performs an intelligent write management (IWM) of the physical pages, as represented by block 176. This IWM operation re-assesses physical page allocations and re-maps physical page allocations with the goal of improving and/or optimizing disk I/O operations. Block 178 represents the storage of page maps 116 by the disk 112, and these page maps 116 are utilized by the I/O subsystem 102 to keep track of stored data. These maps must also be communicated back to the cache subsystem, so that any cached pages are mapped correctly.

Figure 2A:
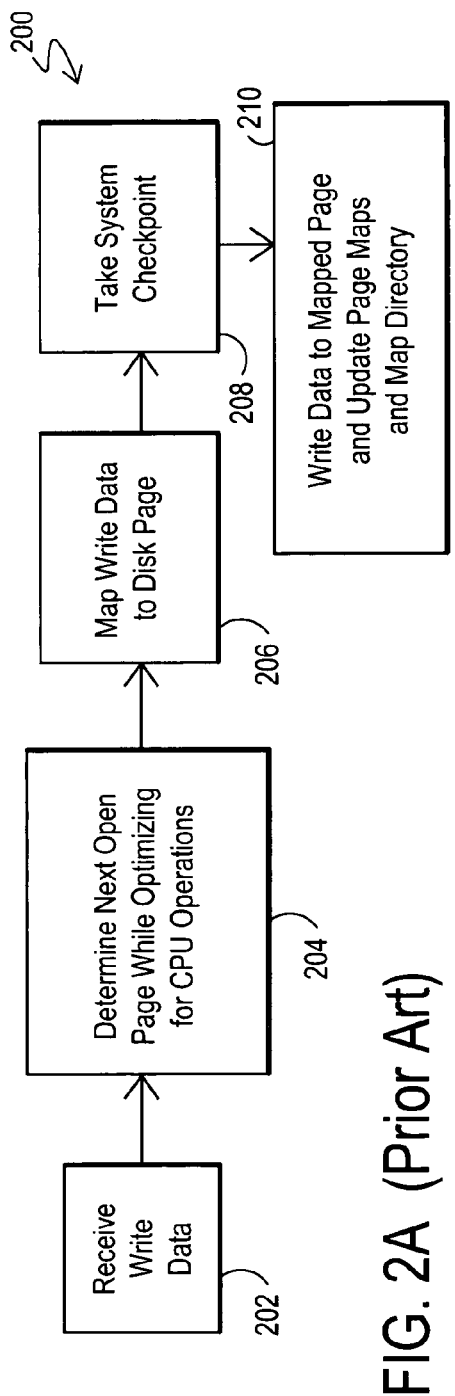
FIG. 2A (prior art) is a process diagram for typical procedures used by conventional database systems to handle disk pages for write operations at system checkpoint events.

FIG. 2A (prior art) is a process diagram for typical procedures 200 used by conventional database systems to handle disk pages for write operations at system checkpoint events. In block 202, the cache subsystem 104 of a database server application 106 receives write data related to a database write request (such as to modify existing data or to add new data to a database file) and stores it within a local cache, such as in main memory for a computer system operating as the database server. In block 204, the I/O subsystem 102 identifies and assigns a disk page that will satisfy the requested write operation. This disk page allocation is typically optimized for efficiency of the central processing unit (CPU). As such, as shown in block 204, the I/O subsystem 102 in prior systems will typically look to identify the first known open page that will satisfy the write operation, thereby reducing the amount of CPU time taken to accomplish the page allocation task. In block 206, the write data is mapped to the allocated disk page by the I/O subsystem 102. Block 208 represents the time at which a checkpoint operation is taken in order to write data from the local cache to disk storage, as discussed above. In block 210, the write data in the local cache is written to the mapped page. In addition, the page maps 116 and the map directory 118 are updated as appropriate to represent the changes made to the disk storage. These typical procedures 200 provide the advantage of reducing the amount of CPU time taken to identify the disk pages to be used for checkpoint operations; however, these typical procedures 200 can require large costs in disk access times due to the number of different write operations that are often required.

Figure 2B:
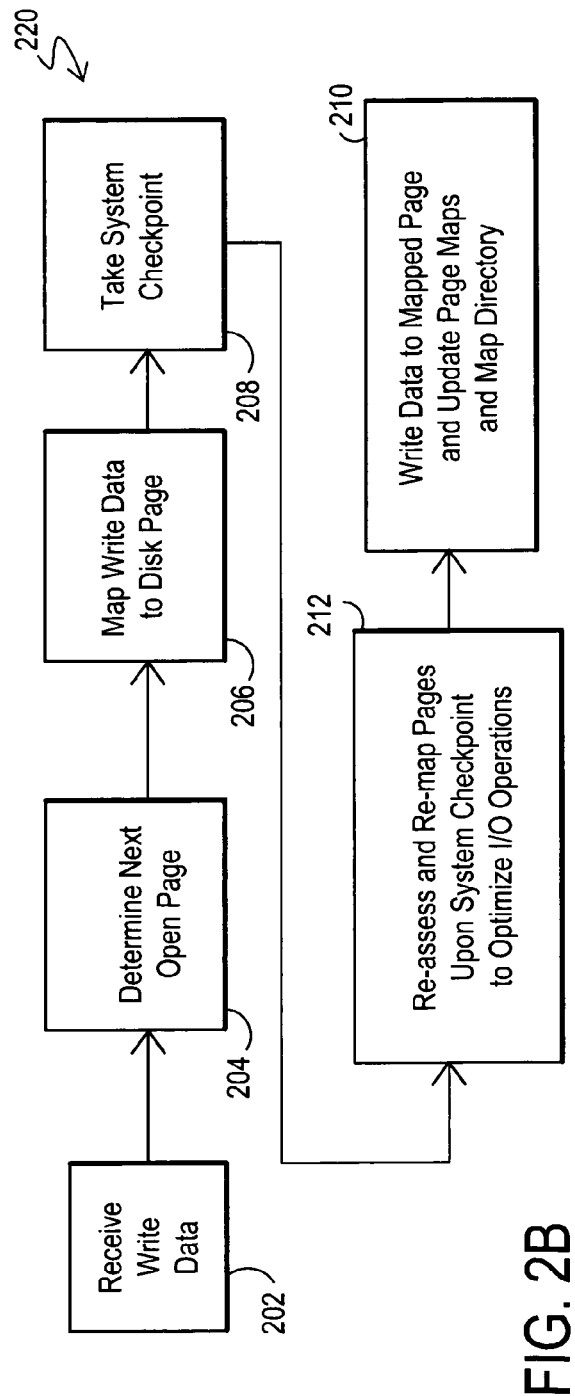
FIG. 2B is a process diagram for example procedures used by a database application that takes advantage of the intelligent write management feature according to the present invention to handle disk pages for write operations at system checkpoint events.

FIG. 2B is a process diagram for example procedures 220 used by a database server application 106 that takes advantage of the intelligent write management module 100 according to the present invention to handle disk pages for write operations at system checkpoint events. As compared to the typical procedures 200 discussed above, the present invention adds an operation to re-assess and re-map disk pages so as to make more efficient and/or optimize disk write operations. In the example depicted, this additional activity is represented by block 212 in which the mapped pages are re-assessed and re-mapped upon at the time of a system checkpoint operation such that I/O operations are optimized and/or made more efficient. Although this intelligent write management has the cost of using CPU time to run algorithms implemented by the IWM module 100, significant efficiency savings are realized in the disk write operations in block 210. These I/O efficiency savings can far outweigh the initial CPU cost and can provide an advantageous overall reduction in the down-time experienced by the database server application 106 during checkpoint operations.

Figure 3A:
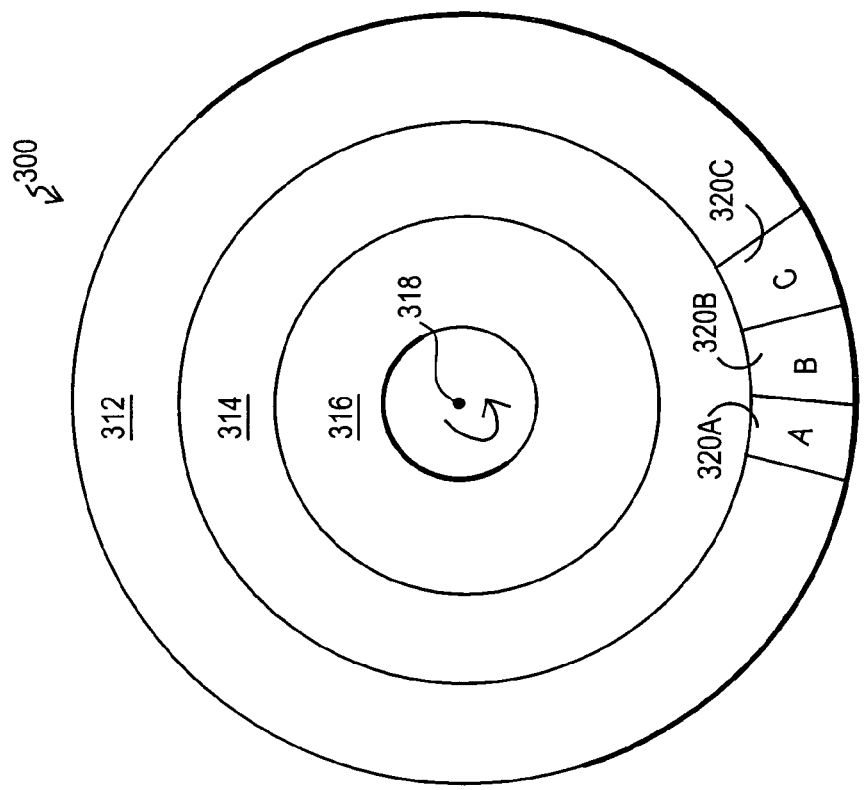
FIG. 3A is a diagram of a disk resource where non-contiguous areas are accessed resulting in seek and rotation latencies.

FIG. 3A is a diagram of a disk resource 300 where non-contiguous areas are accessed resulting in seek and rotation latencies, such as would be expected where a database server application 106 utilizes the typical disk map procedures 300 of FIG. 2A. As depicted, disk resource 300 includes a number of different tracks represented by tracks 312, 314 and 316 with element 318 representing the axis of rotation for the media platen within the disk drive. Three data segments represented by segments A, B and C are to be written into disk pages 320A, 320B and 320C, respectively, which represent the three open disk pages identified in block 204 of the procedures 200 of FIG. 2A. Due to the nature of how open pages are selected in typical systems, the disk pages to be utilized for writes are often located in non-continuous portions of the disk and in many cases, they are located on different tracks. When the disk drive finishes writing data segment A to disk page 320A, the disk drive must relocate the read/write head to the new disk page location for disk page 320B in preparation for writing data segment B. This seek and reposition operation takes a finite amount of time typically measured in milliseconds. Similarly, when the disk drive finishes writing data segment B to disk page 320B, seek time and reposition time is expended to prepare the disk drive to write segment C to disk page 320C. Thus, it is seen that as the number different write operations increases, the amount of time to complete the write operations also increases. For the large number of write operations that are often needed at system checkpoint operations, the amount of down-time for the database application server 106 can be significant. It is further noted that disk drives have become relatively complex, including a plurality of media platens and read/write heads within each disk drive. Although access times have been improved as disk drive technology has improved, the cumulative latency for write operations at system checkpoint operations can become a perceptible and palpable problem for client systems trying to access data from the database application server 106. In addition, CPU speeds have improved exponentially faster than disk drive speeds, in part due to the physical limitations of rotating platens and head movement within the disk drives. As a result, the gap between CPU performance and disk performance continues to increase.

Figure 3B:
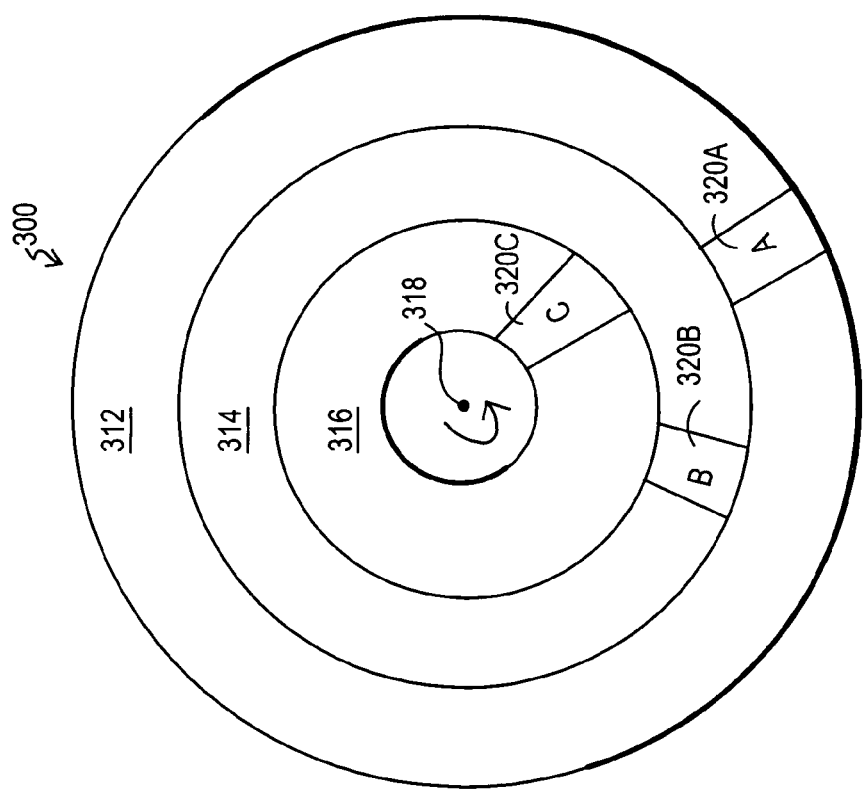
FIG. 3B is a diagram of a disk resource where contiguous areas are accessed in order to eliminate seek and rotation latencies.

FIG. 3B is a diagram of a disk resource 300 where disk pages have been re-mapped so that contiguous disk pages are accessed sequentially to eliminate seek and rotation latencies, such as would be the goal where a database server application 106 utilizes the IWM module 100 and disk map procedures 350 of FIG. 2B. As depicted, based upon a re-assessment and re-allocation of disk pages for data segments A, B and C, these data segments can be written in a sequential and relative continuous manner into disk pages 320A, 320B and 320C, respectively.

Figures 4A, 4B:
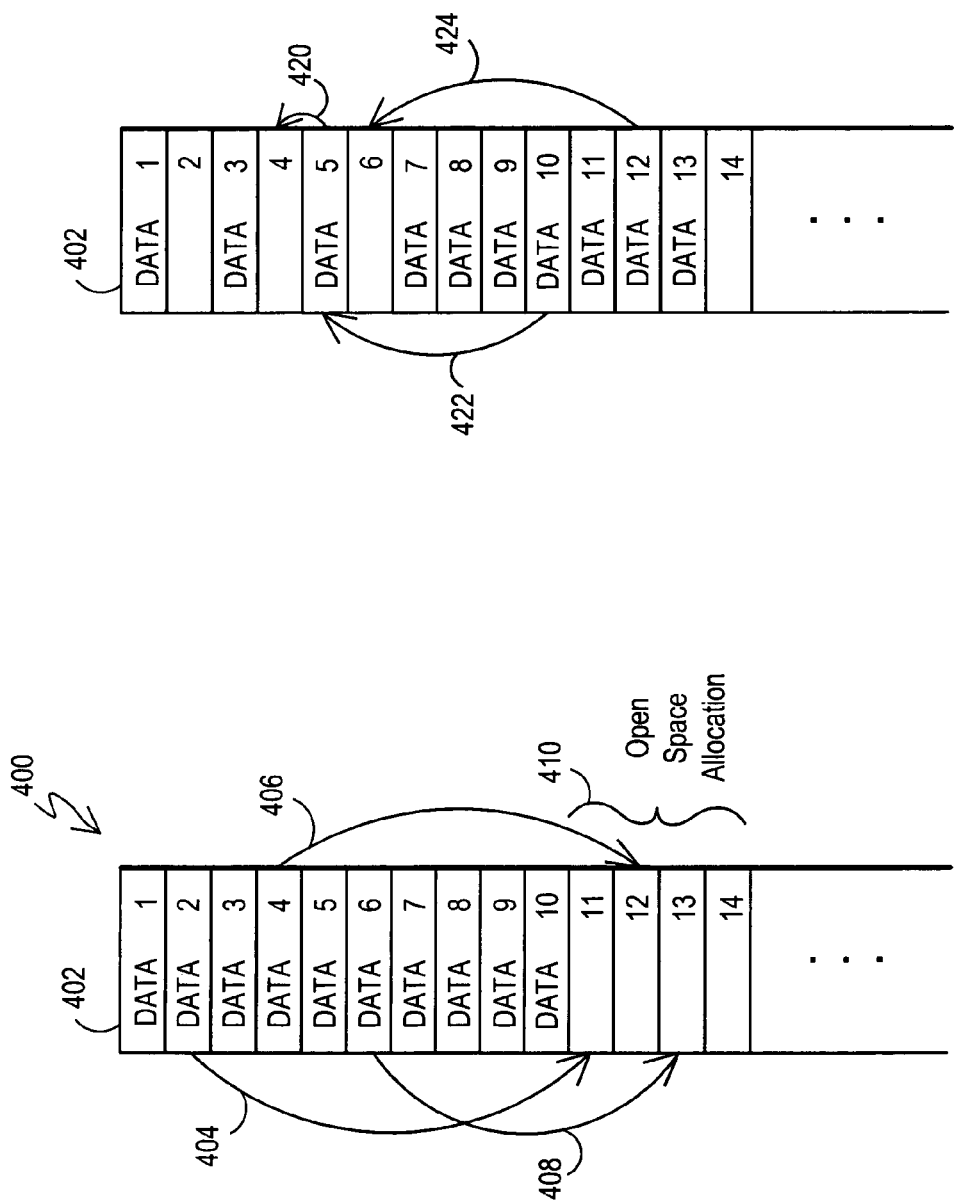
FIGS. 4A–4D are example disk page diagrams representing disk page allocation procedures for example database file and page management procedures for example data modifications and new data operations for these disk pages.
Figures 4C, 4D:
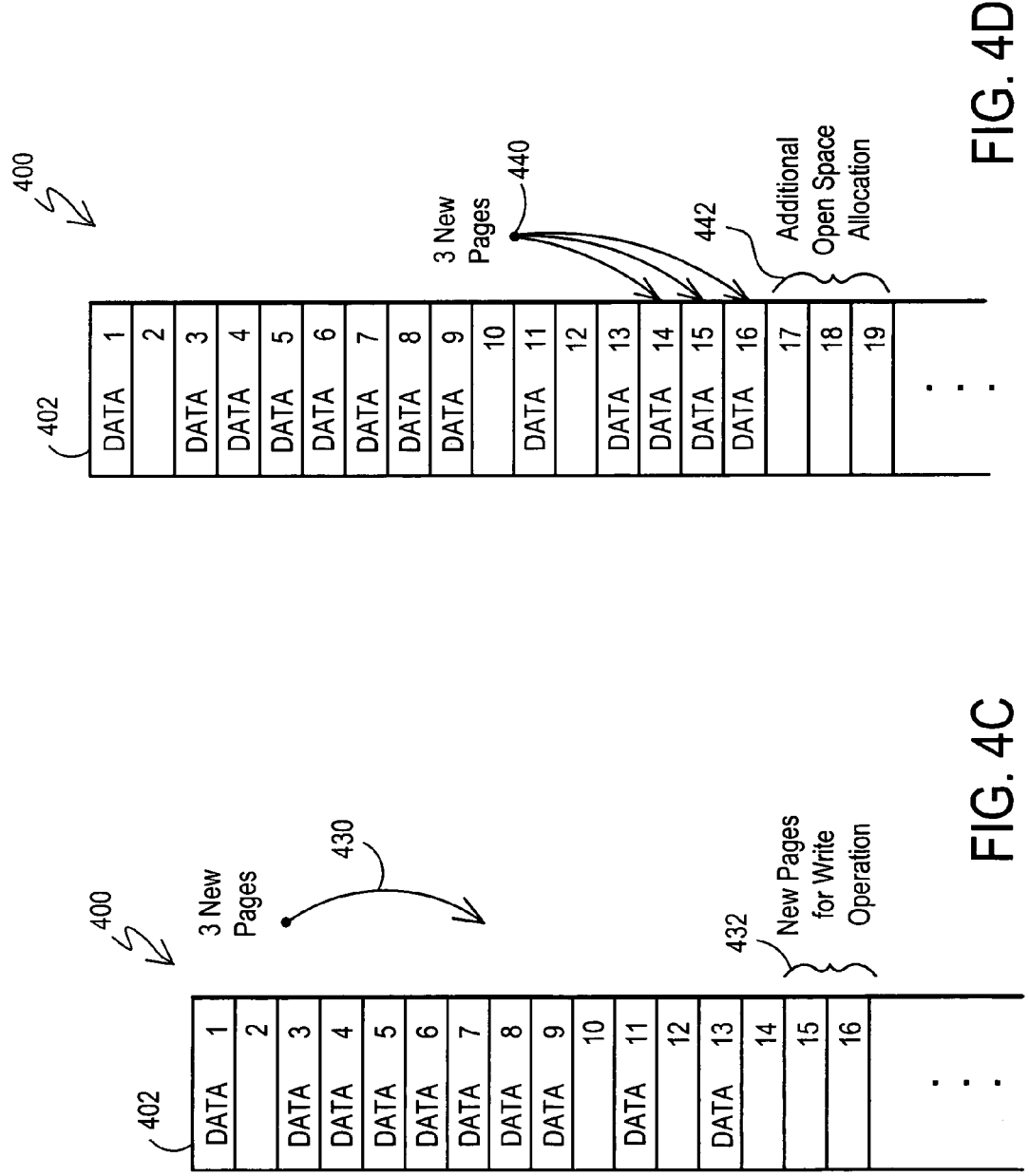

FIGS. 4A–4D are example disk page diagrams representing disk page allocation procedures for example database file and page management procedures for example data modifications and new data operations for these disk pages. More particularly, FIG. 4A presents an example database file that has been allocated fourteen disk pages of which the first ten currently hold data. The transition from FIG. 4A to FIG. 4B depicts a write modification to data within three disk pages of the database file. The transition from FIG. 4B to FIG. 4C depicts a second write modification to data in three different disk pages of the database file. And the transition from FIG. 4C to FIG. 4D represents an addition of data to the database file that increases the database file by three disk pages. As described below, these database operations provide examples for how disk pages can be intelligently managed for write operations.

It is initially noted that for current systems, when a change is made to a database record, a new physical page is assigned to the user's version of that record (before the change is committed). The page number is a matter of convenience. When the page is committed (the user commits the transaction), the page is added to the system transaction. At a checkpoint, the system transaction is written to disk. As described above and depicted in the procedures 250 of FIG. 2B, the present invention takes the time to re-assess disk page allocations and to re-map intelligently the disk page allocations so that I/O efficiencies are achieved. In other words, using the IWM module 100, the database server application 106 sorts the allocated pages in the system transaction before writing them to disk thereby achieving at least in part coincident contiguous writes for the write operations that are required to occur. In this way, the database server application 106 is capable of assigning page locations on disk by finding and/or creating holes in the physical file so that multiple pages can be written as a single system write and as large data blocks, thereby improving overall performance of the database system. In part, therefore, the present invention provides an advantage to the extent that contiguous free space in the file can be found for write operations to occur. As a result, increasing the file size beyond what is needed for current data within that file can provide for contiguous free space that may be used for future write operations. For this reason, it is desirable to provide configuration settings that specify additional growth and file size padding information for database files being managed.

Looking first to FIG. 4A, a series of disk pages 402 are represented including disk pages 1 to 14. These fourteen disk pages represent an example database file that is managed by the database server application 106 and stored on disk 112. As depicted, disk pages 1–10 include data for a database file. Open space allocation 410 represents additional disk pages that can be allocated to the database file to provide room for additions and modifications to the database file to be accomplished while still keeping the data localized to the same area of the disk 112. As described further with respect to FIG. 4D below, this open space allocation can be set such that it is related to some percentage of the disk pages currently used to store data for the database file. For example, in the embodiment of FIG. 4A, a 40% open space percentage could be used such that the used disk pages are multiplied by 40% to determine the number of additional open pages that are allocated to the database file. In this example, therefore, four additional open disk pages 11–14 are allocated to the database file. It is noted that the open space allocation may be made based upon different parameters or criterion, as desired, and that the open space allocation amount described above that is related to a percent of used space within the file is intended only as an example implementation. With respect to this example implementation, it is further noted that the open space allocation can be implemented to keep the open space within a file below, above or equal to the selected percentage amount of the used space within the file.

FIG. 4A represents the initial state of the database file prior to write operations that would modify data within disk page 2, disk page 4 and disk page 6 at a system checkpoint. Utilizing the intelligent management module 100, the I/O subsystem 102 will re-assess and re-mapped disk pages previously selected for the write modify operations. In this depiction, the IWM module 100 could identify disk pages 11, 12 and 13 for a contiguous write operation. As such, the data in disk page 2 can be modified and written to disk page 11 as represented by line 404. The data in disk page 4 can be modified and written to disk page 12 as represented by line 406. And the data in disk page 6 can be modified and written to disk page 13 as represented by line 408.

FIG. 4B represents the state of the database file after the three write modify operations represented in FIG. 4A. Disk pages 11, 12 and 13 now include data in addition to disk pages 1, 3, 5 and 7–10 that previously included data. Disk pages 2, 4, 6 and 14 are now open. There are still four open pages for the ten pages that include data, thereby still keeping the 40% additional open space allocation. In FIG. 4B, write modify operations are occurring on data within disk page 5, disk page 10 and disk page 12. Utilizing the IWM module 100, the I/O subsystem 102 will re-assess and re-allocate disk pages previously selected for the write modify operations. With a typical prior system, it is noted that open disk pages 4, 6 and 14 would have likely been selected for the three write operations, thereby causing data to be written into three non-contiguous disk pages. In the example of FIG. 4B, the IWM module 100 has identified disk pages 4, 5 and 6 for a contiguous write operation. The data in disk page 5 can be modified and written to disk page 4 as represented by line 420. The data in disk page 10 can be modified and written to disk page 5, which became open after disk page 5 was written to disk page 4, as represented by line 422. And the data in disk page 12 can be written to disk page 6 as represented by line 424.

FIG. 4C represents the state of the database file after the three additional write operations represented in FIG. 4B. Disk pages 1, 3–9, 11 and 13 now include data. And disk pages 2, 10, 12 and 14 are now open. Again, there are four open pages for the ten pages that include data, thereby still keeping the 40% additional open space allocation and a total allocation of fourteen pages for the database file. In FIG. 4C, a write operation is contemplated that will add data to the database file and require three new pages to be written with data. This write operation is represented by line 430. With a typical prior system, it is noted that open disk pages 2, 10 and 12 would likely be selected for the write operation to add three pages of data to the database file, thereby causing data to be written into three non-contiguous disk pages. In contrast, the IWM module 100 determines that a more efficient write operation could be achieved by assigning two new pages 15 and 16, as represented by element 432, such that pages 14, 15 and 16 can be used for a contiguous write operation.

In addition to assigning two new pages for the write operation, as represented in FIG. 4D, the IWM module 100 also attempts to keep the open space allocation at the desired level. To achieve this allocation, the I/O subsystem initially determines that in addition to the two new disk pages 15 and 16 that will include data, a further addition of three open disk pages will be needed to maintain the 40% open space allocation. In other words, after the write addition operation, there will be thirteen disk pages that include data and six disk pages that are open, thereby exceeding the 40% open space allocation number. Rather than cause a non-contiguous write to fill disk pages 2, 10 and 12 followed by an addition of five open disk pages to meet the open space allocation, the IWM module 100 instead allocates two new disk pages to the database file and selects disk page 14 and newly allocated disk pages 15 and 16 for a contiguous write operation to add the new data. As shown in FIG. 4D, data is then written to disk pages 14, 15 and 16 as represented by lines 440. As represented by element 442, the IWM module 100 then assigns additional disk pages 17–19 to the file, and these three new pages are used to satisfy the desired open space allocation along with open disk pages 2, 10 and 12.

As shown in the examples provided by FIGS. 4A–4D, therefore, by taking the time at the system checkpoint to determine an efficient way to write new and modified data to the disk, the intelligent write management feature of the present invention allows for a more efficient and/or optimized I/O operations. Rather then simply choosing the next open page, the IWM module 100 of the present invention analyzes the write operations to be done at the system checkpoint re-allocates disk pages so that the write operations can be done using contiguous and sequential disk pages to the extent possible. It is noted, therefore, that as the size of the database and the number of write operations increase, significant efficiency savings are achieved by the intelligent write management of the present invention.

Figure 5A:
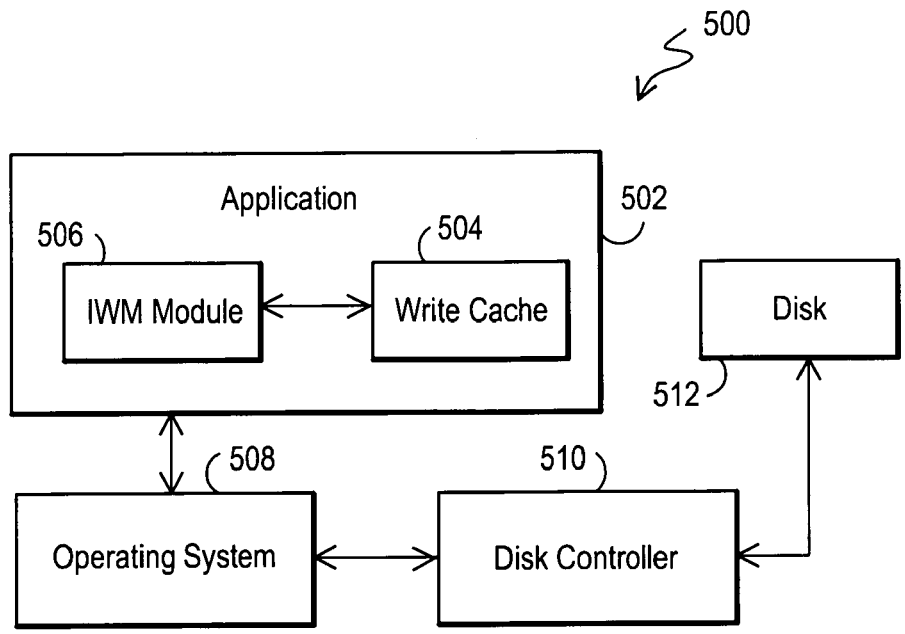
FIG. 5A is a block diagram for a generalized environment where an application utilizes the intelligent write management module of the present invention.

FIG. 5A is a block diagram for a generalized environment 500 where an application 502 utilizes an intelligent write management module 506 to help manage write operations related to taking checkpoints to write data from the write cache 504 to the disk 512. As depicted, the application 502 communicates with the operating system 508 to request disk operations. The operating system 508 then communicates with the disk controller 510 which in turn communicates with the disk 512 to effect any request disk I/O operations. Similar to the database implementation described above, as the data managed by the application 502 becomes larger and larger and the number of write operations requested by users of the application 502 become larger and larger, the write cache 504 will tend to have more and more write operations. Without utilizing the intelligent write management feature of the present invention, checkpoint events will tend to take more and more I/O time to accomplish as disk writes cause latencies due to non-contiguous and non-intelligently managed disk write operations.

Figure 5B:
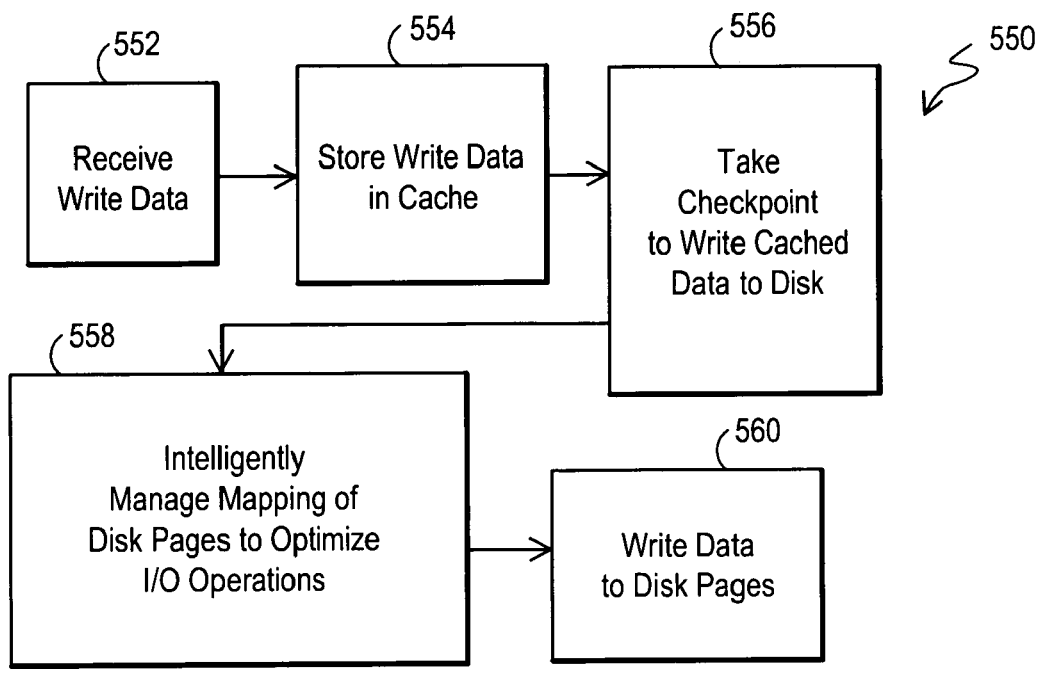
FIG. 5B is a block diagram for a generalized process diagram for example procedures used by an application that takes advantage of the intelligent write management feature according to the present invention to handle disk pages for write operations at system checkpoint events.

FIG. 5B is a block diagram for a generalized process diagram for example procedures 550 used by an application 502 that takes advantage of the intelligent write management feature according to the present invention to handle disk pages for write operations at checkpoint events. These procedures 550 are in part similar to those of procedures 250 in FIG. 2B. First, in block 552, write data requests are received by the application 502. In block 554, write data is stored in the cache 504. In block 556, a checkpoint is taken to write the cached data to the disk 512. Block 558 represents the operation of the IWM module 506 to intelligently manage the mapping of disk pages in order to make more efficient and/or optimize disk I/O operations. Finally, in block 560, the data is written to the disk pages using the disk pages allocated by the IWM module 506, thereby achieving efficiency advantages in the checkpoint operation and reducing the down-time for the application 502.

In operation, therefore, the present invention seeks to re-map data flushed from cache to contiguous locations on the disk in order to reduce latency associated with seek and rotation delays. If several small writes are issued from application 502, the operating system 508 will pass these writes or reads on an individual basis to the disk controller 510. The invention seeks to streamline this process by grouping these disk accesses from application 502 to disk 512 in as few calls to the operating system 508 as possible, which will then perform fewer operations to the disk 512 via disk controller 510, as opposed to more operations that are disjointed.

The benefits associated with the present invention may be dependent on specific factors related to the database or application environment in which it is implemented. These factors include: the degree of writing that must take place at system checkpoints, the page size of the disk being used, and the system transaction settings. Applications that predominantly read data will not be affected as positively as those that perform a significant amount of write operations to the database file stored on disk. Files with smaller page sizes tend to receive a higher degree of benefit, because smaller pages can more easily be re-allocated. System transaction or checkpoint configurations will also potentially affect the benefit realized by the present invention. Applications with frequent but small system transactions will likely experience a consistent small benefit, whereas those with larger but less frequent system transactions will experience much shorter periods of unresponsiveness. In addition, there may be external factors that affect the benefits accrued by this technique. For example, when working with a highly fragmented disk, large contiguous writes at the OS level may still incur a good deal of disk seeking, although it would reduce OS latency. Disk stripe configurations would also be less likely to take full advantage of this approach, although they would likely receive some benefit.

TABLE 1 below provides example data for an investigation done to determine the level of expected efficiency savings based upon different database and/or application environments. First, with respect to TABLE 1, a simulation of various mechanisms for writing to a file, offering several permutations on each, was conducted to ascertain the potential benefit of the present invention. Some of the variables that were manipulated in the study were the write mechanism, the size of write cache, the size of file, the disk page size and the size of hole or open space found when a write would occur. The percentages in the right column of TABLE represents a comparison between to the intelligent write management (IWM) of the present invention and a prior technique of sorted asynchronous writes, which is a procedure that merely sorts the writes by pre-assigned physical page number, taking advantage of coincidently adjacent writes if they exist. It is also noted that his study also assumed a pure write environment for the operations being conducted. TABLE 1 below provides a summary of information determined from the study.

TABLE 1

BENEFIT COMPARISON BASED UPON SIMULATION STUDY

| Database Size | Write Cache Size | Page Size | IWM Benefit (X times faster) |
|---|---|---|---|
| 256 MB | 64 MB | 1K | 15.9 |
| | | 4K | 5.7 |
| | 128 MB | 1K | 6.7 |
| | | 4K | 3.9 |
| | 256 MB | 1K | 3.2 |
| | | 4K | 2.1** |
| 600 MB | 64 MB | 4K | 7.3 |
| | 128 MB | 4K | 6.2 |
| | 256 MB | 4K | 4.5 |
| | 512 MB | 4K | 2.6 |
| 1.2 GB | 64 MB | 1K | 52.9 |
| | | 4K | 10.4 |
| | 128 MB | 1K | 35 |
| | | 4K | 7.7 |

TABLE 1-continued

BENEFIT COMPARISON BASED UPON SIMULATION STUDY

| Database Size | Write Cache Size | Page Size | IWM Benefit (X times faster) |
|---|---|---|---|
| 4.8 GB | 64 MB | 1K | 105*** |
| | | 4K | 13.6 |
| | 128 MB | 4K | 11.6 |

As shown in the right column of TABLE 1, the approach of the present invention at worst was simulated to provide write operations that were a little more than twice as efficient in terms of speed when compared to write operations using the existing sorted asynchronous write approach. That worst case (marked with "" in TABLE 1) included a 256 MB database size, a 256 MB write cache size, and a 4K page size. The best case (marked with "*" in TABLE 1) included a 4.8 GB database size, a 64 MB write cache size, and a 1K page size. In analyzing the resulting data, the most significant factors appeared to be the size of the database, the size of the cache and the disk page size. One other factor that was assessed, but not included in TABLE 1, was the size of located hole, which did not make a noticeable difference. In addition, as shown in TABLE 1, as the size of the write cache decreased, the benefits of the present invention improved. Likewise, smaller page sizes provided more opportunity for allocating writes to occur in more efficient and/or contiguous manner. It is also noted that for the study represented by the data within TABLE 1, each write was guaranteed to take up two pages (the original and the changed version of the page), reducing the effective write cache by half. In addition, the simulation study assumed holes could be found and that there was no accounting for overhead for doing so. And as stated above, the simulation assumed pure write operations, where typical database update operations include a read operation and a write operation.

As stated above, the simulation results set forth in TABLE 1 were based upon an assumption that the environment was a pure write environment. Thus, the results do not take into account the amount of reads versus writes involved in the environment. To estimate the impact of the number of reads versus writes, a first simulation was conducted with no write operations, and a second simulation was conducted with read and write operations as would be expected in a high-transaction application. The results are summarized in TABLE 2 below and provide an estimate the percentage of time that a high-transaction application spends in writing compared to reading.

TABLE 2

COMPARISION BETWEEN READ-ONLY AND READ + WRITE OPERATIONS

| Cache to Database Percentage | Transactions/ Second for 18% cached | Transactions/ Second for 36% cached | Transactions/Second for fully cached (w/system) |
|---|---|---|---|
| Read-Only Operations | 4 users: 102<br>32 users: 155<br>96 users: 207 | 4 users: 110<br>32 users: 266<br>96 users: 357 | 4 users: 1022<br>32 users: 3179<br>96 users: 3155 |
| Read + Write Operations | 4 users: 42<br>32 users: 63<br>96 users: 55 | 4 users: 42<br>32 users: 69<br>96 users: 66 | 4 users: 69<br>32 users: 95<br>96 users: 83 |

With respect to the data within TABLE 2, there were three set conditions for the percentage of the cache size to the database size, namely 18% cached, 36% cached, and fully cached (through system cache). In addition, there were three sets of user sizes analyzed, namely 4 users, 32 users and 96 users. The read-only operations conducted were three reads by each user. The read+write operations were three reads followed by four writes by each user. The results are provided in transactions (operation sets) per second, where higher is better.

Several things can be inferred from the data in TABLE 2. First, in moderate cache-to-database conditions (i.e., the 18% and 26% columns), three reads plus four writes take about 3–4 times longer than 3 reads by themselves. This puts each write operations at about 2–3 times more expensive in access time than a read operation. Thus, a conservative estimate can be made that the method of the present invention would have an impact on around 65% of the total operation time for a high-transaction application. As cache increases, however, read performance increases disproportionately to write performance. In a fully cached database (i.e., the "full" column), writes take approximately 35–38 times longer than reads with respect to the 32 and 96 user level. In this full cache environment, therefore, even a few writes can significantly degrade overall system performance. Thus as the read cache increases, it is expected that the present invention will have an exponential performance benefit.

As mentioned previously, the size of the efficiency savings provided by present invention is in part dependent upon the ability to find holes at the end of or within the database file or contiguous write operations and/or the ability to extend the size of the database file to create such holes within the database file. At some point, however, extending the file size can become undesirable. Therefore, defragmentation operations could be implemented and used during some writes, in addition to or instead of using holes, in order to defragment the database file to better organize the database file for write operations.

As discussed above, present invention improves disk I/O performance by making write operations more efficient from an I/O perspective. In database server application operations, as change operations are performed, the modified pages are placed in a background writer queue. Periodically the background thread wakes up and writes out these dirty pages. In assessing the efficiencies to be gained by the present invention, simulation studies were done to examine the problem of how to quickly write dirty pages out on to disk. The different options of writing out a set of dirty pages that were examined by the simulator are set forth below, with the last two taking advantage of the present invention:

Random—write pages them in random order,

Sort—sort the pages according to page number and write them out in the sorted order, Sort Coalesce—in addition to sorting, adjacent pages were coalesced (a single-write system-call may be issued for a number of pages that are adjacent to each other and scatter/gather APIs may also he used where applicable), IWM/Single Page—new page numbers are assigned at write time such that pages are contiguous as far as possible and they are written out to their new locations one page at a time IWM/Blocks—similar to IWM/Single Page where multiple pages are written out with a single system call when possible (again scatter/gather APIs may be used where applicable).

As stated above, the two IWM options above take advantage of the intelligent write management of the present invention, in which disk pages are re-assessed and re-mapped at the time of a checkpoint operation to make more efficient and/or optimize write operations form an I/O perspective. The method of the present invention provides improved performance compared to a sort coalesce operation due to the larger number of contiguous sectors that are written. It is also noted that for server machines with fast disks, block sizes tend not to make a difference when above 32K. On desktop systems, it is noted that the block sizes do not tend to make a difference when above 4 k. Under these limits, however, using larger block sizes typically improves performance.

To create and/or find large contiguous spaces inside a database file for write operations, a number of different methods can also be employed, as desired. Approaches to this are well-known to those skilled in the art, and might include persisting the largest holes with the page maps or page directories or determining the holes gradually at runtime. Although the suitability of one approach over the other is in large part determined by the specific use case, the preferred embodiment includes persistence of knowledge of contiguous free space and maintenance of that knowledge at runtime. This knowledge can easily be maintained in a variety of well-understood data structures; one embodiment might be an array of linked lists.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures for database processing. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for managing disk pages for checkpoint write operations, comprising:

storing a file on a disk system, the file including data that is utilized by a plurality of users and the disk system configured to have a plurality of disk pages, a portion of which are used to store the file data for the file;

managing user access to the file data using a cache, the cache being configured to store at least a portion of the file data and provide an interface between the users and the file data stored in the file on the disk system;

receiving write requests for the file data from the users, each write request including write data to be written to the file on the disk system in a write operation;

assigning disk pages for use in performing the requested write operations and storing the write data in the cache until a checkpoint operation;

upon the occurrence of a checkpoint operation, re-mapping the assigned disk pages to make more efficient the write operations associated with the write data stored in cache; and writing the write data to the file on the disk system utilizing the re-mapped disk pages.

2. The method of claim 1, further comprising allocating more disk pages to the file upon occurrence of a checkpoint operation where such an allocation is determined to make more efficient the write operations associated with the write data stored in cache.

3. The method of claim 1, wherein the file comprises a database and the checkpoint operation comprises a database system checkpoint taken by a database application server that is managing the cache.

4. The method of claim 1, wherein the re-mapping of disk pages attempts to organize the write operations such that contiguous disk pages can be written.

5. The method of claim 4, wherein contiguous pages are written one page at a time.

6. The method of claim 4, wherein contiguous pages are written as multiple pages at a time using as single function call.

7. The method of claim 1, further comprising when a file is initially stored on the disk system, allocating enough disk pages to store current file data and allocating some number of additional open disk pages to provide a desired amounts of open space within the file.

8. The method of claim 7, wherein the desired amount is an amount related to a percent of used space within the file.

9. The method of claim 7, wherein additional open pages are allocated to the file if data is added to the file during a checkpoint operation.

10. A computer implemented application with improved write operation efficiency for handling checkpoint operations with respect to a data cache, comprising:
 a disk system configured to have a plurality of disk pages, a portion of these disk pages being used to store a file that includes data that is accessed by a plurality of users;
 a first subsystem configured to manage user access to the file data using a cache, the cache being configured to store at least a portion of the file data and provide an interface between the users and the file data stored in the file on the disk system; and
 a second subsystem coupled to the disk system and communicating with the cache subsystem, the second subsystem being configured to handle write operations to the disk system during checkpoint operations;
 wherein the disk pages are assigned and write data stored in the cache as write requests for the file data are received from users, each write request including write data to be written to the file on the disk system in a write operation; and
 wherein assigned disk pages are re-mapped upon the occurrence of a checkpoint operation to make more efficient the write operations associated with the write data stored in cache.

11. The computer implemented application of claim 10, wherein more disk pages are allocated to the file upon occurrence of a checkpoint operation where such an allocation is determined to make more efficient the write operations associated with the write data stored in cache.

12. The computer implemented application of claim 10, wherein the application comprises a database application server, the file comprises a database and the checkpoint operation comprises a database system checkpoint taken to manage cache operations.

13. The computer implemented application of claim 10, wherein the second subsystem attempts to re-map disk pages to organize the write operations such that contiguous disk pages can be written.

14. The computer implemented application of claim 13, wherein contiguous pages are written one page at a time.

15. The computer implemented application of claim 13, wherein contiguous pages are written as multiple pages at a time using as single function call.

16. The computer implemented application of claim 10, wherein an initially stored file is allocated enough disk pages to store current file data and is allocated some number of additional open disk pages to provide a desired amount of open space within the file.

17. The computer implemented application of claim 16, wherein the desired amount is an amount related to a percent of used space within the file.

18. A database system with intelligent management of disk pages for cache checkpoint operations, comprising:
 a disk system configured to have a plurality of disk pages;
 a database stored as a file on the disk system, the database file utilizing a portion of the disk pages and including data that is accessed by a plurality of database users;
 a database application server coupled to the disk system and managing the database file, the database application server being configured to communicate with a plurality of client user systems, the database application server, comprising:
  a cache subsystem configured to manage user access to the file data using a cache, the cache being configured to store at least a portion of the file data and provide an interface between the users and the file data stored in the file on the disk system; and
  an input/output (I/O) subsystem configured to handle write operations to the disk system during checkpoint operations;
  wherein the disk pages are assigned and write data stored in the cache subsystem as write requests for the file data are received from users, each write request including write data to be written to the file on the disk system in a write operation; and
  wherein assigned disk pages are re-mapped upon the occurrence of a checkpoint operation to make more efficient the write operations associated with the write data stored in cache.

19. The database system of claim 18, wherein the I/O subsystem is configured to allocate more disk pages to the file upon occurrence of a checkpoint operation where such an additional allocation is determined to make more efficient the write operations associated with the write data stored in cache.

20. The database system of claim 18, wherein the I/O subsystem attempts to re-map disk pages to organize the write operations such that contiguous disk pages can be written.

21. The database system of claim 20, wherein contiguous pages are written one page at a time.

22. The database system of claim 20, wherein contiguous pages are written as multiple pages at a time using as single function call.

23. The database system of claim 18, wherein an initially stored file is allocated enough disk pages to store current file data and is allocated some number of additional open disk pages to provide a desired amount of open space within the file.

24. The database system of claim 23, wherein the desired amount is an amount that is related to a percent of used space within the file.

* * * * *